(12) United States Patent
Moreton

(10) Patent No.: US 6,379,530 B1
(45) Date of Patent: Apr. 30, 2002

(54) POLYISOBUTENE SUBSTITUTED SUCCINIMIDES

(75) Inventor: David J. Moreton, Derbyshire (GB)

(73) Assignee: The Lubrizol Corporation, Wickliffe, OH (US)

( * ) Notice: Subject to any disclaimer, the term of this patent is extended or adjusted under 35 U.S.C. 154(b) by 0 days.

(21) Appl. No.: 09/581,047

(22) PCT Filed: Dec. 21, 1998

(86) PCT No.: PCT/GB98/03845

§ 371 Date: Jun. 7, 2000

§ 102(e) Date: Jun. 7, 2000

(87) PCT Pub. No.: WO99/32585

PCT Pub. Date: Jul. 1, 1999

(30) Foreign Application Priority Data

Dec. 20, 1997 (GB) .............................................. 9726831

(51) Int. Cl.$^7$ .......................... C10L 1/04; C10D 403/02
(52) U.S. Cl. .............................. 208/15; 208/16; 208/17; 548/314.7
(58) Field of Search ........................ 548/314.7; 208/15, 208/16, 17

(56) References Cited

U.S. PATENT DOCUMENTS 4,234,435 A    11/1980   Meinhardt et al. ...... 252/51.5 A

FOREIGN PATENT DOCUMENTS

| DE | 1745812    | 2/1970  |
|----|------------|---------|
| EP | 0400867 A1 | 12/1990 |
| EP | 0422858 A2 | 4/1991  |
| EP | 0422858 A3 | 11/1991 |
| EP | 0565285 A1 | 10/1993 |
| EP | 0623631 A2 | 11/1994 |
| EP | 0632123 A1 | 1/1995  |
| EP | 0899276 A1 | 3/1999  |
| JP | 07278142   | 3/1994  |

OTHER PUBLICATIONS

Micropatent Abstract for JP07278142 (Nippon Zeon Ltd, Mar. 31, 1994).

*Primary Examiner*—Thuan D. Dang
(74) *Attorney, Agent, or Firm*—Michael F. Esposito; Samuel B. Laferty; David M. Shold

(57) ABSTRACT

This invention relates to a compound represented by the formula

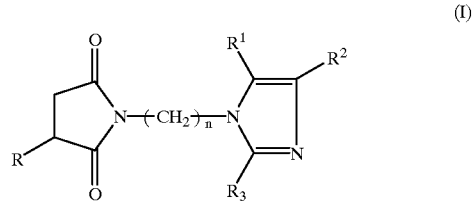

(I)

wherein in formula (I): R is a polyisobutene group; $R^1$, $R^2$ and $R^3$ are each independently hydrogen, alkyl groups of 1 to 18 carbon atoms, cycloalkyl groups of 4 to 10 carbon atoms or aryl groups of 6 to 10 carbon atoms; and n is an integer of 0 to 4. The invention relates to an additive package for use in making fuels comprising the foregoing compound. The invention also relates to fuel compositions comprising the foregoing compound.

12 Claims, No Drawings

POLYISOBUTENE SUBSTITUTED SUCCINIMIDES

TECHNICAL FIELD

This invention relates to novel polyisobutene substituted succinimides and their use as fuel additives.

BACKGROUND OF THE INVENTION

Hydrocarbon fuels generally contain numerous deposit-forming substances. When used in internal combustion engines, deposits tend to form on and around constricted areas of the engine in contact with the fuel. In diesel engines, deposits tend to accumulate in the fuel injection system, thereby hampering good performance of the engine. In spark ignition engines deposits can build up on engine intake valves leading to progressive restriction of gaseous fuel mixture flow into the combustion chamber and also to valve sticking. It is common practice therefore to incorporate a detergent in the fuel composition for the purpose of inhibiting the formation, and facilitating the removal, of engine deposits, thereby improving engine performance.

Many different types of compounds are known as detergents for fuels. Typical examples include polyisobutene-substituted (PiB) succinimides such as those disclosed in EP-A-565285, where the amine portion is derived from a polyalkylene amine.

JP-A-07278142 discloses that the reaction product of an imidazoline and a PiB succinic acid is useful as a dispersant in compositions which are used as lubricants for gasoline.

It has now been discovered the novel PiB succinimides of this invention are effective detergents for use in fuels.

SUMMARY OF THE INVENTION

This invention relates to a compound represented by the formula

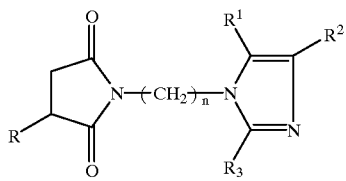

(I)

wherein in formula (I): R is a polyisobutene group; $R^1$, $R^2$ and $R^3$ are each independently hydrogen, alkyl groups of 1 to 18 carbon atoms, cycloalkyl groups of 4 to 10 carbon atoms or aryl groups of 6 to 10 carbon atoms; and n is an integer of 0 to 4. The invention also relates to an additive package for use in making fuels comprising the foregoing compound. The invention relates to fuel compositions containing the foregoing compound.

DESCRIPTION OF THE PREFERRED EMBODIMENTS

The novel compounds of the invention are compounds represented by the formula

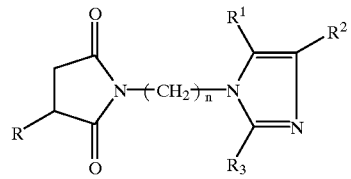

(I)

wherein in formula (I): R is a polyisobutene (PiB) group; $R^1$, $R^2$ and $R^3$ are each independently hydrogen alkyl groups of 1 to 18 carbon atoms, cycloalkyl groups of 4 to 10 carbon atoms, or aryl groups of 6 to 10 carbon atoms; and n is an integer of from 0 to 4. In one embodiment, $R^1$, $R^2$ and $R^3$ are each H. In one embodiment, n is 1 to 4, and in one embodiment n is 3.

In one embodiment, the polyisobutene group R is derived from a "high reactive" PiB. PiBs in which at least 70% of the terminal olefinic double bonds are of the vinylidene type are commonly known as "high reactive" polyisobutenes, as distinguished from "low reactive" PiBs having a lower proportion of vinylidene terminal double bonds. In one embodiment, at least 80% of the terminal olefinic double bonds are of the vinylidene type, and in one embodiment at least 90% are of the vinylidene type. Examples of "high reactive" polyisobutenes include Ultravis® marketed by BP Chemicals and Glissopal® marketed by BASF.

Preferably the PiB has a number average molecular weight of from 700 to 2500, and in one embodiment from 750 to 1500.

In one embodiment, the compounds of the invention may be made by reacting a PiB-substituted succinic acylating agent such a polyisobutene succinic anhydride (PiBSA) with aminopropylimidazole. Methods for making PiB-substituted succinic acylating agents are well known in the art; examples are disclosed in EP-A-565285 and EP-A-623631. In one embodiment, the compounds are made by reacting the acylating agent with aminopropylimidazole in the presence of a solvent. The solvent can be an aromatic or aliphatic hydrocarbon solvent.

In one embodiment, the invention provides for a fuel composition comprising a major amount of a hydrocarbon fuel, and from 10 to 1000 parts per million (ppm) based on the total weight of the fuel composition of foregoing compound of the invention. In one embodiment, the compound of the invention is added to the fuel as part of an additive package, the package being added to the fuel at concentrations of from 200 to 3000 ppm, and in one embodiment from 600 to 1000 ppm. Thus another aspect of the invention provides an additive package for fuel compositions, comprising from 5 to 30% by weight of the inventive compound, a carrier fluid, and optionally a solvent, preferably an aromatic or aliphatic hydrocarbon solvent. Suitable carrier fluids include alkyl phenols, optionally alkoxylated; esters of acids/alcohols, acids/polyols or acids/glycol ethers, the acids being saturated or unsaturated; phthalate esters; trimellitate esters; alkoxylated alcohols or polyols; polyalkylene glycols; and lubricating oils. Suitable solvents may include most known aromatic or aliphatic hydrocarbons or glycol ethers. The invention also comprises in a still further aspect the use of the inventive compounds or additive packages as detergents in hydrocarbon fuels.

In one embodiment, the hydrocarbon fuel comprises a hydrocarbon fraction boiling in the gasoline range or a hydrocarbon fraction boiling in the diesel range. Gasolines suitable for use in spark ignition or gasoline engines, e.g.

automobile engines, generally boil in the range from 30° C. to 230° C. Such gasolines may comprise mixtures of saturated, olefinic and aromatic hydrocarbons. They may be derived from straight-run gasoline, synthetically produced aromatic hydrocarbon mixtures, thermally or catalytically cracked hydrocarbon feedstocks, hydrocracked petroleum fractions or catalytically reformed hydrocarbons. The octane number of the base fuel is not critical and will generally be above 65. In the gasoline, hydrocarbons may be replaced in part by alcohols, ethers, ketones or esters, typically in an amount up to 20% by weight. Alternatively, as the liquid hydrocarbon fuel there may be used any fuel suitable for operating spark compression or diesel engines, such as those which may be found in road vehicles, ships and the like. Generally, such a diesel fuel will boil in the range from about 140° C. to about 400° C. (at atmospheric pressure), particularly in the range from about 150° C. to 390° C., especially from about 175° C. to 370° C. Such fuels may be obtained directly from crude oil (straight-run) or from a catalytically or thermally cracked product or a hydrotreated product, or from a mixture of the aforesaid. Alternatively there may be used a biofuel, for example rape seed methyl ester. The cetane number will typically be in the range from 25 to 60.

In one embodiment, the fuel composition contains the compound of formula (I) in an amount sufficient to provide dispersancy. Typically in a gasoline fuel this amount is in the range from 20 to 1000 ppm w/w based on the total weight of the composition. Typically in a diesel fuel this amount is in the range from 10 to 500 ppm w/w based on the total weight of the composition.

The fuel composition may be prepared by blending a concentrate composition comprising a fuel compatible hydrocarbon solvent and the compound of formula (I) with the hydrocarbon fuel.

The fuel composition may contain in addition to the compound of formula (I) known fuel additives. The nature of the additives depend to some extent on the end-use of the fuel composition. Diesel fuel compositions may contain nitrates or nitrites as a cetane improvers, or copolymers of ethylene and/or vinylesters, e.g. vinylacetate, as pour point depressants. Gasoline fuel compositions may contain a lead compound as an anti-knock additive and/or an antioxidant, e.g. 2,6-di-tert-butyl phenol, and/or an anti-knock compound other than a lead compound, and/or an additional dispersant, for example a PIB polyamine. The other additives (if any) may be blended directly into the fuel composition or may be incorporated by way of a concentrate composition.

The compounds of the invention are useful as thermal stabilisers for jet fuels. In high speed aircraft, both civilian and military, the liquid fuel is combusted to produce power, but also is circulated in the aircraft as a heat exchange fluid to remove the excess heat generated at such speeds e.g. in lubricating oils. The fuel is thus maintained for long periods at high temperatures, which results in discoloration and/or decomposition to produce soluble coloured products and/or insoluble products such as gums, sediments and granular material. Insoluble products can form deposits that reduce the heat exchange capacity and can block filters potentially causing loss of power. Soluble coloured by-products are unsightly and an indication of some decomposition. The cause of discoloration and/or decomposition may be from phenols, naphthenates and sulphur compounds and/or metals which are often present in the fuels. The compounds of the present invention reduce or prevent this discoloration and/or decomposition when added to jet fuels. Accordingly another aspect is the use of the compound of the invention to reduce or prevent discoloration and/or decomposition upon heating of jet fuels. Jet fuels containing the compound of formula (I) have an improved thermal stability as shown by a reduced tendency to discolor and/or produce solids on heating compared to the fuel alone in the isothermal corrosion and oxidation test (ICOT based on ASTM D4871).

In one embodiment, the compound of the inveniton is present in the jet fuel in amount of at least 1 ppm, and in one embodiment 1 to 1000 ppm, and in one embodiment 5 to 500 ppm, and in one embodiment 10 to 100 ppm; based on the total weight of the jet fuel composition. The compound may be mixed with the jet fuel in the form of a concentrate, e.g. in an aliphatic aromatic hydrocarbon solvent at 20 to 80% by weight of said compound, or it may be added neat to the jet fuel.

Jet fuel itself is a middle boiling distillate, usually kerosene which may be mixed with gasoline and optionally light petroleum distillate as in mixtures of gasoline and kerosene or light petroleum distillate, e.g. in weight amounts of 20–80:80–20 such as 50–75:50–25. The fuels for military use are designated JP4 to JP 8:e.g. JP4 as 65% gasoline/35% light petroleum distillate (according to US Mil. Spec. MIL 5624G). JP5 is similar to JP4 but of higher flash point. JP7 is a high flash point special kerosene for advanced supersonic aircraft. JP8 is a kerosene similar to Jet A1 (according to MIL 83133C). Jet fuel for civilian use is usually a kerosene type fuel and designated Jet A or Jet A1. The jet fuel may have a boiling point of 65–350° C. or 65–320° C., initial boiling point of 150–220° C., e.g. 200° C., a 50% boiling point of 220–320° C. and a 90% boiling point of 260–350° C., and API Gravity of 30–40. Jet fuels for turbojet use may boil at 90–260° C. (ASTM D1655-59T). Further details on aviation fuels may be obtained from "Handbook of Aviation Fuel Properties", Coordinating Research Council Inc., CRC Report No. 530 (Society of Automotive Engineers Inc., Warrendale, Pa., USA, 1983) and on US military fuels, from "Military Specification for Aviation Turbine Fuels", MIL-T-5624P.

The jet fuel may be a straight run kerosene optionally with added gasoline, which preferably is purified to reduce its content of components contributing to, or encouraging formation of colored products and/or precipitates. Among such components are aromatics, olefins and mercaptans. Thus the fuels may be purified to reduce their mercaptan content, e.g Merox fuels and copper sweetened fuels, or to reduce their sulphur content, e.g. hydrofined fuels or Merifined fuels. Merox fuels are made by oxidation of the mercaptans and have a low mercaptan S content (e.g. less than 0.005% wt S, and in one embodiment 0.0001–0.005% wt. S) but a higher disulphide S content (e.g. up to 0.4% wt S, and in one embodiment up to 0.3% wt S, and in one embodiment 0.05 to 2%, and in one embodiment 0.05 to 0.25%); their aromatic (e.g. phenolics) and olefins content are hardly changed. Hydrofined jet fuels are ones in which the original fuel has been hydrogenated to remove at least some of the sulphur compounds, e.g. thiols, and under severe conditions to saturate the aromatics and olefins; hydrofined jet fuels have very low sulphur contents (e.g. less than 0.01 % S by weight). Merifined fuels are fuels that have been extracted with an organic extractant to reduce or remove their contents of sulphur compounds and/or phenols. The jet fuel may also contain metals, either following contact with metal pipes or carried over from the crude oil; examples of such metals are copper, nickel, iron and chromium usually in amounts of less than 1 ppm, e.g. each in the 10–150 parts per billion (ppb) concentration range. Merox and hydrofined fuels are preferred and may be used in JP4 to JP8 jet fuels.

The invention will now be further illustrated by reference to the following examples.

EXAMPLE 1

Preparation of Reaction Product of Polyisobutene Succinate and Aminopropylimidazole A 1-litre round-bottomed flask is charged with 400 g (0.345 mol) of a solution of 75% polyisobutene succinic anhydride (obtained by reacting polyisobutene Glissopal 1000 (mol wt. 1000) with maleic anhydride) in 25% A260. A260 is an aromatic solvent available from BP Chemicals. The contents of the flask are then heated with stiring to 175° C., at which point aminopropylimidazole (38 g, 0.306 mol) is added dropwise via a pressure equalizing dropping funnel over a period of 30 minutes. The reaction mixture is then maintained at 175° C. with stirring for a further 3 hours. The resulting product is filtered through a 12 mm Celite pad, and analyzed. Distillate (72.3 g) is collected. The product weight is 352.1 g. The product has following analysis:

N content=3.55%

Alkalinity value=41.2 mgKOH/g

Diesel Engine Test

The compound prepared in the Example 1 is evaluated as a detergency additive in fuel according to the Peugeot XUD 9 engine test. The fuel employed is RF90/6 diesel. The compound is incorporated in an additive package with the following formulation:

| | |
|---|---|
| kerosene-type solvent | 35.9% by weight |
| compound of Example 1 | 22.7% |
| cetane improver | 18.9% |
| lubricity agent | 9.1% |
| dodecyl phenol | 5.3% |
| demulsifier | 4.6% |
| corrosion inhibitor | 3.0% |
| antifoam | 0.5% |

The package is dosed in the fuel at 680 ml/m$^3$, giving a concentration of the compound of Example 1 in the fuel of 155 ml/m$^3$.

Measurements are made of percentage flow loss at 0.1 mm needle lift; the lower the figure the better the result. For the purposes of comparison, two compounds (Examples 2 and 3) which are reaction products of polyisobutene succinate and tetraethylenepentamine are also tested. In Example 2 the PiB used is Hyvis 1000, a low-reactive PiB; this product is a commercially available fuel detergent. In Example 3 the PiB is Glissopal 1000, a high-reactive PiB.

TABLE 1

| EXAMPLE | Average % flow loss at 0.1 mm needle lift |
|---|---|
| no additive package | 89.6% |
| Example 1 | 16.8% |
| Example 2 (comparative) | 79.5% |
| Example 3 (comparative) | 70.7% |

These results demonstrate that the compound of the invention is superior to a commercially available detergent (Example 2), and even superior to an upgraded equivalent of that detergent using a high-reactive PiB (Example 3).

Fuel Stability Test

The test performed is an ICOT test as described in ASTM D4871. 100 ml of fuel is thermally treated (with and without additive in batches of 4, including base fuel as a control) at 180° C. for 5 hours, while continuously passing air through the fuel at a constant flow rate of 150 ml per minute. At the end of this test, the fuel is allowed to cool and "rest" for 24 hours before filtering and weighing to ±1 mg any deposits through pre-weighed 0.45 micron Millipore filters. Both filterable sediment and gum deposits are determined, the overall level of deposition being the sum of the two. The results are expressed as ICOT% efficiency which is 100 ×[Difference in deposit weight of Control—that of sample]÷ Deposit wt of Control]. The efficiency is a measure of how much reduction in deposits is achieved by use of the additives.

The jet fuels employed in the test are:

A. Pernis Merox

B. USAF POSF 3119 Merox

C. USAF POSF 2926 Merox

The compound prepared in Example 1 is the additive used. The results are shown in Table 2 below.

TABLE 2

| Fuel | Additive (ppm) | ICOT % efficiency |
|---|---|---|
| A | 100 | 94 |
| B | 100 | 67 |
| C | 100 | 27 |

These results show that reduced deposits are obtained for a range of jet fuels when the compound of Example 1 is added to the fuel.

While the invention has been explained in relation to its preferred embodiments, it is understood that various modifications thereof will become apparent to those skilled in the art upon reading the specification. Therefore, it is to be understood that the invention disclosed herein is intended to cover such modifications as fall within the scope of the appended claims.

What is claimed is:

1. A compound represented by the formula

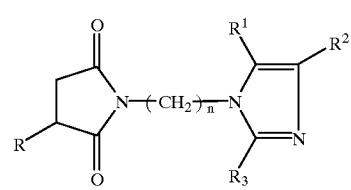

(I)

wherein in formula (I): R is a polyisobutene group; $R^1$, $R^2$ and $R^3$ are each independently hydrogen, alkyl groups of 1 to 18 carbon atoms, cycloalkyl groups of 4 to 10 carbon atoms or aryl groups of 6 to 10 carbon atoms; and n is an integer of 0 to 4.

2. The compound of claim 1 wherein R is derived from a high reactive polyisobutene.

3. The compound of claim 1 wherein n is 1 to 4.

4. The compound of claim 1 wherein $R^1$, $R^2$ and $R^3$ are each hydrogen and n is 3.

5. The compound of claim 1 wherein said polyisobutene group has a molecular weight in the range of 700 to 2500.

6. The compound of claim 1 wherein said compound is derived from polyisobutene succinic anhydride and aminopropylimidazole.

7. An additive package comprising a carrier fluid and from 5 to 30% by weight of the compound of claim 1.

8. The additive package of claim 7 wherein said additive package further comprises a solvent.

9. A fuel composition comprising a major amount of a hydrocarbon fuel and from 10 to 1000 ppm based on the weight of said fuel composition of the compound of claim 1.

10. The fuel composition of claim 9 wherein said hydrocarbon fuel comprises a hydrocarbon fraction boiling in the gasoline range.

11. The fuel composition of claim 9 wherein said hydrocarbon fuel comprises a hydrocarbon fraction boiling in the diesel range.

12. The fuel composition of claim 9 wherein said hydrocarbon fuel is a jet fuel.

* * * * *